(12) United States Patent
Ash

(10) Patent No.: US 11,120,064 B2
(45) Date of Patent: Sep. 14, 2021

(54) TRANSLITERATION OF DATA RECORDS FOR IMPROVED DATA MATCHING

(71) Applicant: Amazon Technologies, Inc., Seattle, WA (US)

(72) Inventor: Stephen Michael Ash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 16/197,222

(22) Filed: Nov. 20, 2018

(65) Prior Publication Data

US 2020/0159857 A1    May 21, 2020

(51) Int. Cl.
*G06F 16/338* (2019.01)
*G06F 16/335* (2019.01)
*G06F 40/284* (2020.01)
*G06F 40/263* (2020.01)
*G06F 16/35* (2019.01)

(52) U.S. Cl.
CPC ........ *G06F 16/353* (2019.01); *G06F 16/335* (2019.01); *G06F 16/338* (2019.01); *G06F 40/263* (2020.01); *G06F 40/284* (2020.01)

(58) Field of Classification Search
CPC ..... G06F 16/337; G06F 16/353; G06F 40/284
USPC .......................................... 707/708, 999.004
See application file for complete search history.

(56) References Cited

U.S. PATENT DOCUMENTS

| 2005/0240393 A1* | 10/2005 | Glosson | G06F 40/166 704/8 |
| 2012/0016663 A1 | 1/2012 | Gillam et al. | |
| 2012/0253785 A1* | 10/2012 | Hamid | G06F 40/58 704/4 |

FOREIGN PATENT DOCUMENTS

WO    WO 2020/106644 A1    5/2020

OTHER PUBLICATIONS

Automatic Language Detection Based on Unicode Ranges, Retrieved from the Internet, https://github.com/nvaccess/nvda/issues/2990, Feb. 13, 2013, 23 pages.
International Search Report and Written Opinion received in PCT Application No. PCT/US2019/062056 dated Feb. 12, 2020 in 14 pages.

* cited by examiner

*Primary Examiner* — Robert W Beausoliel, Jr.
*Assistant Examiner* — Pedro J Santos
(74) *Attorney, Agent, or Firm* — Knobbe, Martens, Olson & Bear, LLP

(57) ABSTRACT

A data records service is configured to receive original data records and, in parallel, generate a transliterated version of the original data record into a phonetic based language. Individual fields of data records can be transliterated by identifying a primary language, generating language specific tokens for individual text portions, and transliterating the token. The records processing service can then execute matching models on both original data records and transliterated data records to detect matching data records.

22 Claims, 8 Drawing Sheets

US 11,120,064 B2

TRANSLITERATION OF DATA RECORDS FOR IMPROVED DATA MATCHING

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) or access a service from a server computing device via the network (e.g., the Internet). In such embodiments, the user computing device can be referred to as a client computing device and the server computing device can be referred to as a content provider or service provider.

In some applications, service providers can generate or receive data as part of the interaction with a plurality of user devices or other network-based devices. The service providers may wish to store and maintain the data and make the stored data accessible at a later date. In such applications, the service provider may utilize a network-based data service that can be utilized to receive data via the communication network. The network-based database service can further provide requested data via the communication network. Additionally, the network-based database service can receive commands related to utilization of stored data by other services.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
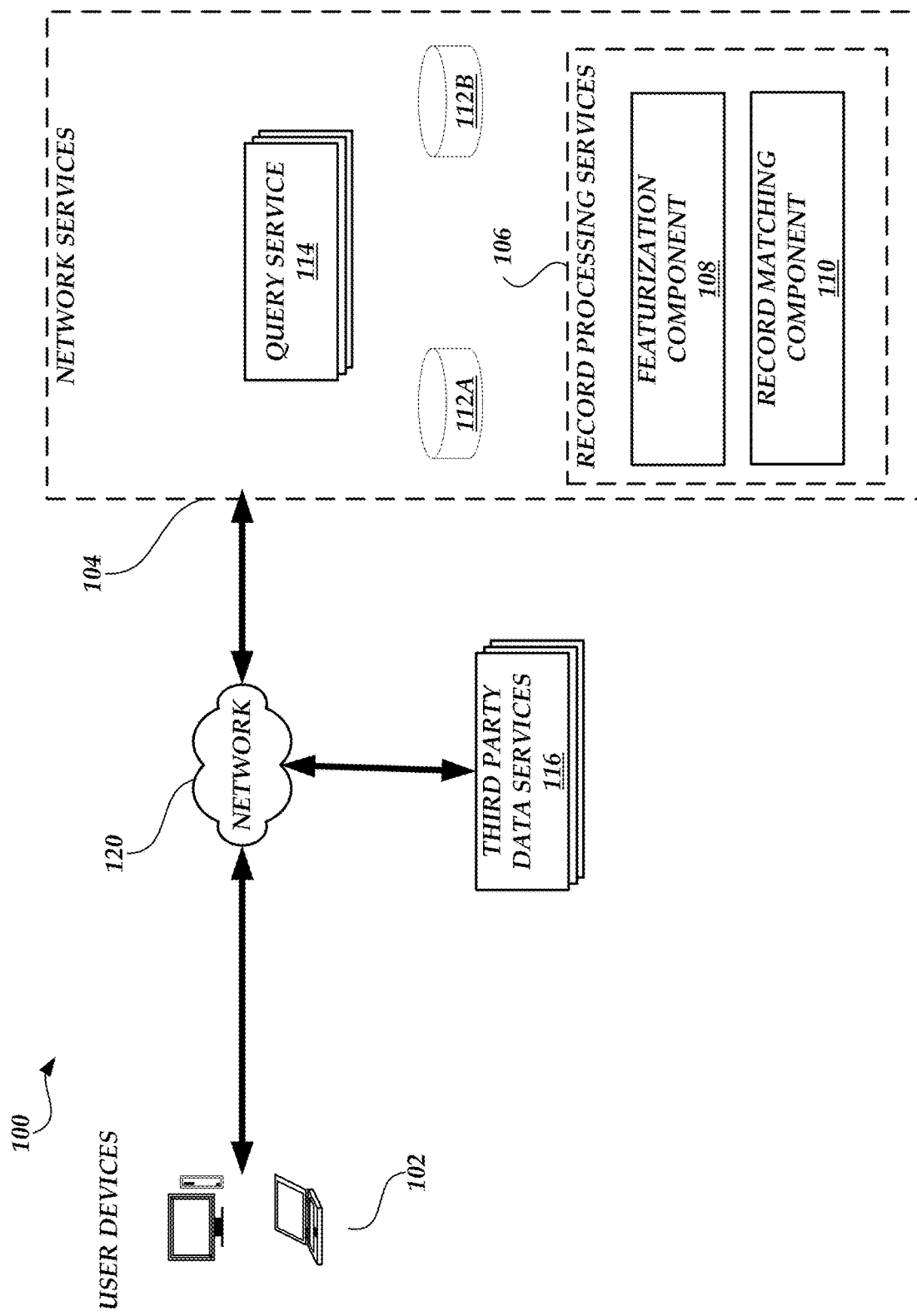
FIG. 1 is a block diagram of a network environment that includes one or more user devices, one or more third-party data services, a network services system, one or more query services, and a record processing service in accordance with some embodiments.

Generally described, service providers or content providers can provide or host services that collect or generate data for storage and transmission, which can generally be referred to as a data service or a data records service. With regard to service providers that engage in commerce, the service provider can host one or more services or network resources that interact with user computing devices or other service providers for purposes of facilitating information delivery. As part of the interaction or transaction, one or more components of the services/network resources can generate or obtain data that the service may wish to store, process and transmit. Depending on the type of service provider, interaction or transaction, the type of data that is collected and transmitted can vary.

In some specific embodiments, a data services service provider can receive data records from a number of data sources. In some embodiments, the information associated with the data records may include data that identifies a common subject or has at least partial overlapping subject matter. By way of example, assume a service provider receives data records from a number of data sources that corresponds to a listing of businesses/organizations within a geographic region. Individual listings can include a name of the organization, contact information, or other identifying information as well as meta-data about the organization. Utilizing the received information, the service provider can collect, store and process the information and provide information responsive to queries from individual users or other services, such as a query for businesses/organization matching search criteria.

In some scenarios, the data service services provider can receive multiple listings for the same business/organization, such as from two different data sources providing information about the business organizations. If the data service provider were to keep each data record separate, a processed query may return the identification of seemingly two organizations/businesses that satisfy the search query, which could be considered to be incorrect search results or imprecise. To address this deficiency, a service provider can implement one or more matching models that can process at least a portion of the data records to identify data records that are likely to be considered matching for at least a portion of the search criteria. The matching models can illustratively review some or all of the fields of the data records, generally referred to as data fields, and apply various contextual matching models. For example, a matching model can utilize contextual processing to review one or more data fields or fields of a data record defined to include organization name information and identify organization names that are likely to be matching or partially matching location information. Based on the results of the matching models, the data service provider can then cause data records to be merged or linked such that matched data records are not returned as separate or unrelated data records.

In some additional implementations, a data services service provider can receive data records that may include data in one or more data fields from multiple languages. With reference to the previous example, in some regions, such as Asia, data records may include naming of business or organizations that include one or more Asian languages associated with the region, as well as information associated with one or more additional languages, such as English, French, etc. In the context of Japanese language, company names may be provided utilizing a more formal phonetic-based language, such as katakana. In other instances, company names may be provided in a non-phonetic (e.g. conversational) language, such a kanji. Still further, some of the data records may include the company names, such as in Latin-based languages that include both phonetic-based languages, such as Spanish, and non-phonetic-based languages, such as English. Even further, with regard to the Japanese language example, data records can include a heterogeneous combination of languages, including Japanese phonetic-based words, Japanese non-phonetic-based words and one or more Latin-based words. In such embodiments, the matching models implemented by the data services can be inefficient and inaccurate for determining matching of data records in which one or more data fields include heterogeneous combinations of terms or characters.

To address potential inefficiencies associated with processing multi-language data records, a data service may generate additional featurization data in the form of transliterated versions of one or more data records or portions of data records, such as one or more individual data fields or fields of individual data records. More specifically, aspects of the present application correspond to the utilization of transliteration for one or more portions of data records (e.g., one or more data fields) that include data formed in accordance with one or more non-phonetic languages, such as kanji or Latin-based languages, to generate a supplemental data records for use in execution of a matching model. The supplemental data records may be formed in accordance with a reference phonetic language, such as katakana. The present application corresponds to the utilization of transliteration for one or more portions of data records (e.g., one or more data fields) that include data formed in accordance with one or more phonetic languages. The original data records and supplemental data record can then be processed according to one or more matching models. The results of execution of the matching module on the original and supplement data records, as well as additional data processing, can be utilized to improve accuracy of data records linkage.

Generally described, for purposes of implementing matching models featurization data can be characterized into two major classifications, namely, categorical feature data and numerical feature data. Categorical feature data includes data values having no particular mathematical order, such as organization name, food type, street name, and the like. Typical categorical data can be represented using strings or integers. Numerical feature data includes data values that are quantitative variables taking on a range of values and have a mathematical ordering. Examples of numerical data include income, age, and the like. Numerical feature data can be further characterized as discrete feature data have a relatively small number of available values and continuous feature data having a large number of possible values. Examples of discrete feature data include street address, zip code, and the like. Examples of continuous feature data include temperature, inventory numbers, and the like.

In accordance with aspects of the present application, a records processing service can receive one or more original data records from one or more data sources, illustratively a plurality of data sources. Individual data records includes featurization data or featurization configuration data that corresponds to the data required or utilized by one or more matching models that can be implemented to determine matching data records, such as matching models implemented by AI algorithms. For purposes of the present application, artificial intelligence can generally relate to various technologies utilized to analyze data including, but not limited to, deep learning algorithms, neural network algorithms, machine learning algorithms, big data algorithms, and the like. However, one skilled in the relevant art will appreciate that the present application is not limited to application to AI algorithms or any specific format or type of AI algorithm.

In accordance with one or more aspects of the present application, the records processing service processes the original data record to generate one or more transliterated data records based on the original data records. The featurization component receives the original data records and determines a primary language for one or more portions (e.g., one or more date fields) of the data records. Illustratively, the primary language of the data record can help identify text or characters of the portions of the data records that correspond to a different language. Based on the identified primary language, the featurization component then identifies individual text/characters and generates a language-based token for each individual portion. With reference to the previous illustrative example, in one example, the featurization component can identify individual portions of text/characters and classify the identified individual portions with a token characterizing the language portion as kanji, katakana, or English.

Based on the language tokens, the featurization component then processes the set of tokens to form transliterated versions of the token. Generally described, transliteration is the process of transferring a word from one language to another. In contrast to a translation, which provides the meaning of terms in the target language, transliteration provides information how words are pronounced. For example, transliteration changes the letters from the word's original alphabet to similar-sounding letters in a different, target language. Illustratively, the transliteration process corresponds to an attempt to transliterate the language-based tokens in accordance with a reference language, namely, a phonetic-based language such as katakana. With continued reference to the illustrative example, tokens that katakana-based terms are already in a phonetic-based language and may not need to be transliterated. Tokens in kanji or Latin-based languages can be transliterated into the reference phonetic language, e.g., katakana. The transliteration process can include the transliteration of an alternative phonetic-based language, or partially phonetic-based language, such as Spanish, into the reference phonetic-based language. The transliterated version of the tokens form a transliterated version of the original data records and are then stored as the transliterated version of the portions or select data fields of the data records. Every data field in the original data record does not have to be transliterated to form the transliterated data record such that one or more data fields or portions of the data records can be omitted from the transliteration process.

Once the transliterated data records (e.g., one or more data fields of the original data records) have been created, the records processing service can process the original data records and transliterated data records according to the matching models. Illustratively, the records processing service can receive the results of the matching model on each data record to identify potential matches. Additionally, in further embodiments, the records processing service can combine the original data record and transliterated data record to generate additional results. Based on the results, the records processing service can utilize weighting algorithms or confidence values in determining whether to include matches. For example, the records processing service can associate a confidence factor with matches based on the primary detected language and transliterated tokens (e.g., kanji primary language with English tokens). In another example, the records processing service can associate a confidence factor based on a characterization of accurateness of the transliteration model between certain languages to the phonetic target language. However, in some embodiments, the records processing service may not utilize confidence value or weights and treat a resulting match in any of the matching model executions as a match.

By utilization transliteration of one or more data fields of original data records to form a transliterated version of the original data records in accordance with a reference phonetic-based language, one or more aspects of the present application addresses the inefficiencies described above. More specifically, the records processing service processes the original data records and generates transliterated data records in parallel improve the performance of the matching models and address problems created by the generation of data records from multiple sources that can include different languages in one or more fields.

Although one or more aspects of the present application will be described with regard to specific languages, transliteration processing models and matching models, such examples are illustrative in nature and should not necessarily be construed as limiting. Accordingly, reference to specific reference phonetic and non-phonetic-based languages should not be construed as limiting or expansive of all the language that be applied to one or more aspects of the present application. Additionally, as described above, reference to original data records and transliterated data records can generally correspond to one or more data records having one or more data fields with information. Transliterated versions of an original data record does not require an exact transliterated version of each individual data field of the original data record and can correspond to a transliteration of a subset or portion of the data fields of the original data records.

FIG. 1 illustrates a general network environment 100 for the generation, processing and storing of data. Illustratively, network environment 100 will be described with regard to the generation, processing and storage of data records associated with a plurality of languages. The network environment 100 includes a plurality of devices 102 utilized by individual users, generally referred to as user computing devices, configured to interact with one or more aspects of the network environment component to request data stored by components of the network environment 100. For example, the user devices 102 can transmit requests to query services or Web services that result in the generation of queries for data processed in the network environment 100.

User computing devices 102 may include any number of different computing devices capable of communicating with the networks 120, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

Network 120 may be any wired network, wireless network, or combination thereof. In addition, the networks 120 may be a personal area network, local area network, wide area network, cable network, fiber network, satellite network, cellular telephone network, data network or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While the user device 102 is depicted as having a single connection to the network 120, individual components of the user devices 102 may be connected to the network 120 at disparate points. Accordingly, communication times and capabilities may vary between the components of FIG. 1.

The network environment 100 also includes a set of network services, generally referred to as network service 104 or network services 104, that represents a set of network services made available by one or more service providers via a communication network, such as communication network 120. Illustratively, to facilitate the receipt and processing of data, the network services 104 can include records processing services 106. Records processing services 106 corresponds to a network-based data service hosted by a service provider. The records processing service 106 will be described with regard to receiving information from one or more data sources, processing the data sources to determine matching data records and making the matched data available to a query service as described herein.

For purposes of illustrating aspects of the present application, the records processing service 106 includes a featurization component 108 for receiving original data records from the data services and generating at least one transliterated data record based on the original data records and having one or more transliterated data fields of the original data records. Although illustrated as a single component, the featurization component 108 logically represents one or more computing devices (physical or virtual) that are configured to receive data from data services. For example, the interface component may correspond to any number of physical or virtual computing devices configured in geographically distinct areas. The records processing service 106 further include a record matching component 110 that is configured, at least in part, to manage the storage and processing of the original data records and transliterated data records to determine matches in the received data records. As described below, the records matching component 110 can implement one or more matching models utilizing the original data records and transliterated data records for featurization data. Illustrative components and operation of a featurization component 108 will be described with regard to FIG. 3.

The records processing service 106 can include a plurality of data stores 112A and 112B or database nodes for maintaining the original data records, transliterated data records, and matching data in accordance with one or more aspects of the present application. FIG. 1 illustrates multiple data stores 112 for receiving and maintaining data records. The data stores are logically represented together but may be implemented in a distributed manner, such as via geographically distinct areas. In some embodiments, one or more individual nodes 112 can have a single partition for hosting subsets of the data as described herein. In other embodiment, individual nodes 112 can host multiple partitions.

The network services 104 can further include one or more query services 114, which generally function to generate one or more queries to the records processing service 106 for data. Illustratively, the query services 114 can represent web services or other network-based services that can interact with user device 102 to receive requests and provide responsive content. However, the representation of the query services 114 is intended to be general and not limited to any particular form of interaction with user devices 102 or require interaction with user device 102 in order to generate queries to the records processing service 106. Similarly, in some embodiments the user devices 102 may directly transmit queries to the records processing service 106. It will be appreciated by those skilled in the art that the network services 104 may have fewer or greater components than are illustrated in FIG. 1. Thus, the depiction of the network services 104 in FIG. 1 should be taken as illustrative.

The network environment 100 can include a plurality of data services, such third party data services 116, for collecting or generating data to be received and processed by the records processing service 106. The third party data services 116 may include one or more servers or components that correspond to any one of a variety of functions such as hosting commerce via network 120, providing content via network 120, measuring (directly or indirectly) events and the like. As illustrated in FIG. 1, the third party data services 116 may be hosted independent of the network services 104, such as in a stand-alone communication network and be connected to the network service(s) via communication network 120. Still further, third-party data services 116 may include components associated with the network service 104 and additional independent networks. One skilled in the relevant art will appreciate that reference to third-party data services is intended solely to illustrate the transmission of data to network services and that affiliation of a data service to the network services is not required or prohibited.

Figure 2:
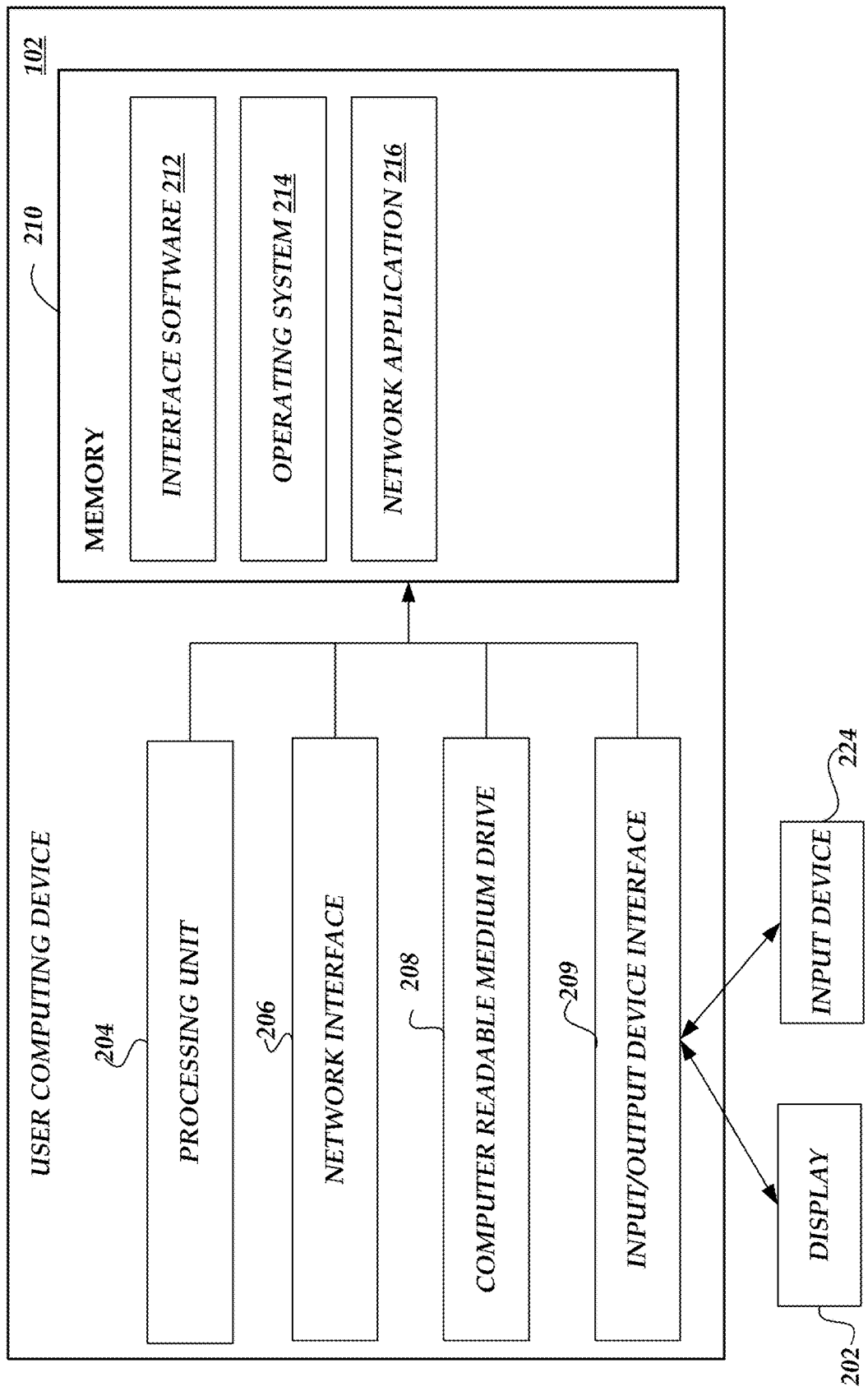
FIG. 2 is a block diagram illustrative of components of user device for interacting with data services or database service in accordance with some embodiments.

FIG. 2 depicts one embodiment of an architecture of an illustrative user computing device 102 that can generate content requests or queries to a query service in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 120 of FIG. 1, and the network services 104. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for transmitting data from the user device 102. In some embodiments, the memory 210 may include one or more additional software applications or components that are configured, at least in part, to transmit commands related to queries to the query service 114.

Figure 3:
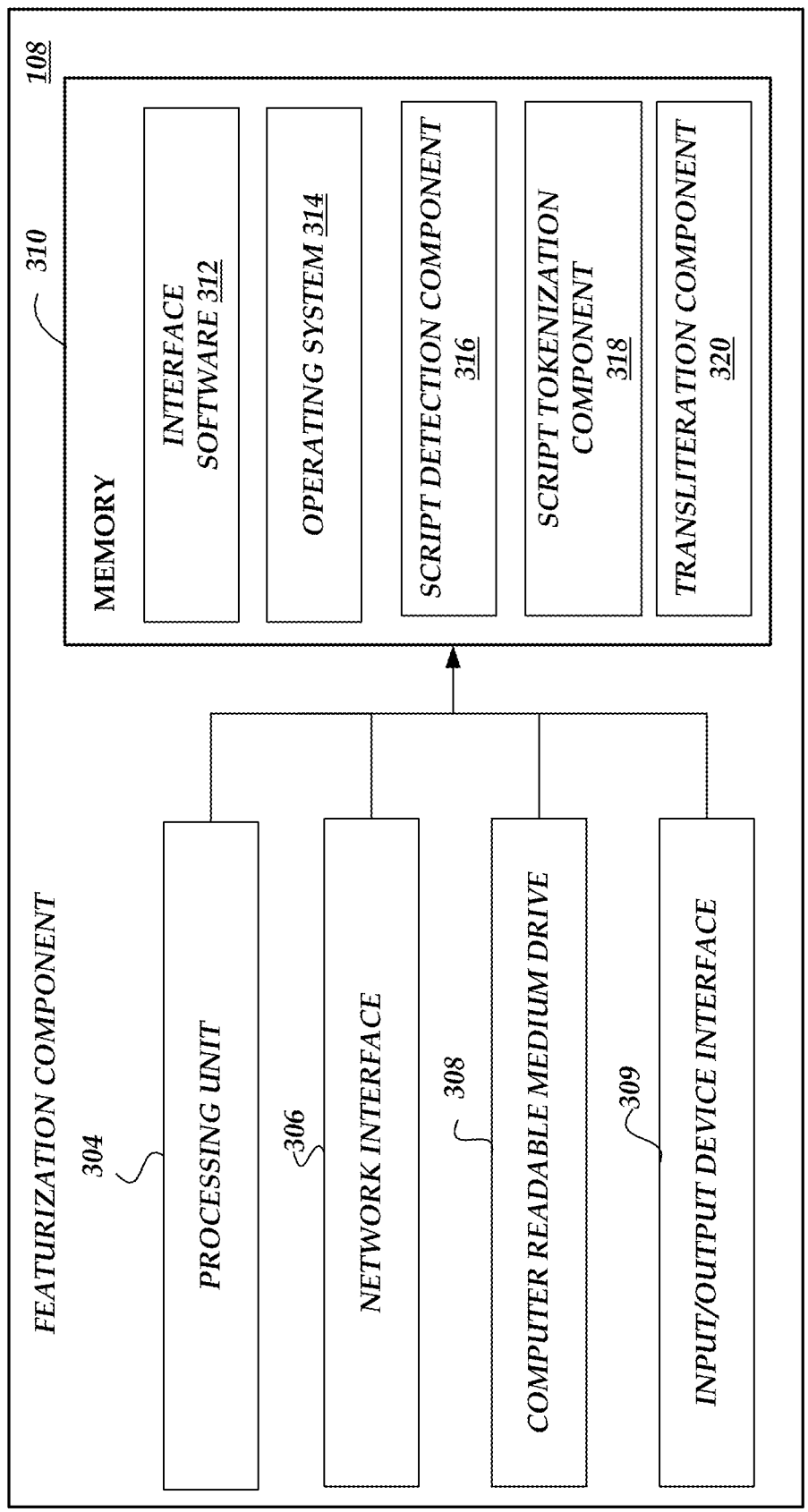
FIG. 3 is a block diagram illustrative of components of a featurization component of a records processing service for managing featurization of data records for further processing in accordance with some embodiments.

FIG. 3 depicts one embodiment of an architecture of an illustrative computing device 300 for implementing various aspects of the management and processing of the data records in accordance with aspects of the present application. The computing device 300 can be a part of the records processing service 106, such as a featurization component 108. Alternatively, the computing device may a stand-alone device independent of the records processing service 106.

The general architecture of the computing device 300 depicted in FIG. 3 includes an arrangement of computer hardware and software components that may be used to implement aspects of the present disclosure. As illustrated, the computing device 300 includes a processing unit 304, a network interface 306, a computer readable medium drive 308, an input/output device interface 309, all of which may communicate with one another by way of a communication bus. The components of the computing device 300 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display via the input/output device interface 409. In some embodiments, the computing device 300 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the computing device 300. The memory 310 may further include computer program instructions and other information for implementing aspects of the present disclosure. For example, in one embodiment, the memory 310 includes interface software 312 for receiving and processing data records. Memory 310 includes a script detection component 316 for processing received data records and determining a primary language as described herein. The memory 310 further includes a script tokenization component 318 for the generation and management of script tokens corresponding to identifiable words or phrases in data records as described herein. The memory 310 also includes a transliteration component 320 for the generation and management of transliterated text corresponding to identified tokens in data records as described herein.

As specified above, in one embodiment, the computing device 300 illustrated in FIG. 3 can be implemented as physical computing devices or virtualized computing devices in a computing network. In another embodiment, the computing device 300 may be implemented as logical components in a virtual computing network in which the functionality of the computing device 300 is implemented by an underlying substrate network of physical computing devices. Thus, aspects of the present application should not be limited to interpretation requiring a physical, virtual or logical embodiment unless specifically indicated as such.

Figure 4A:
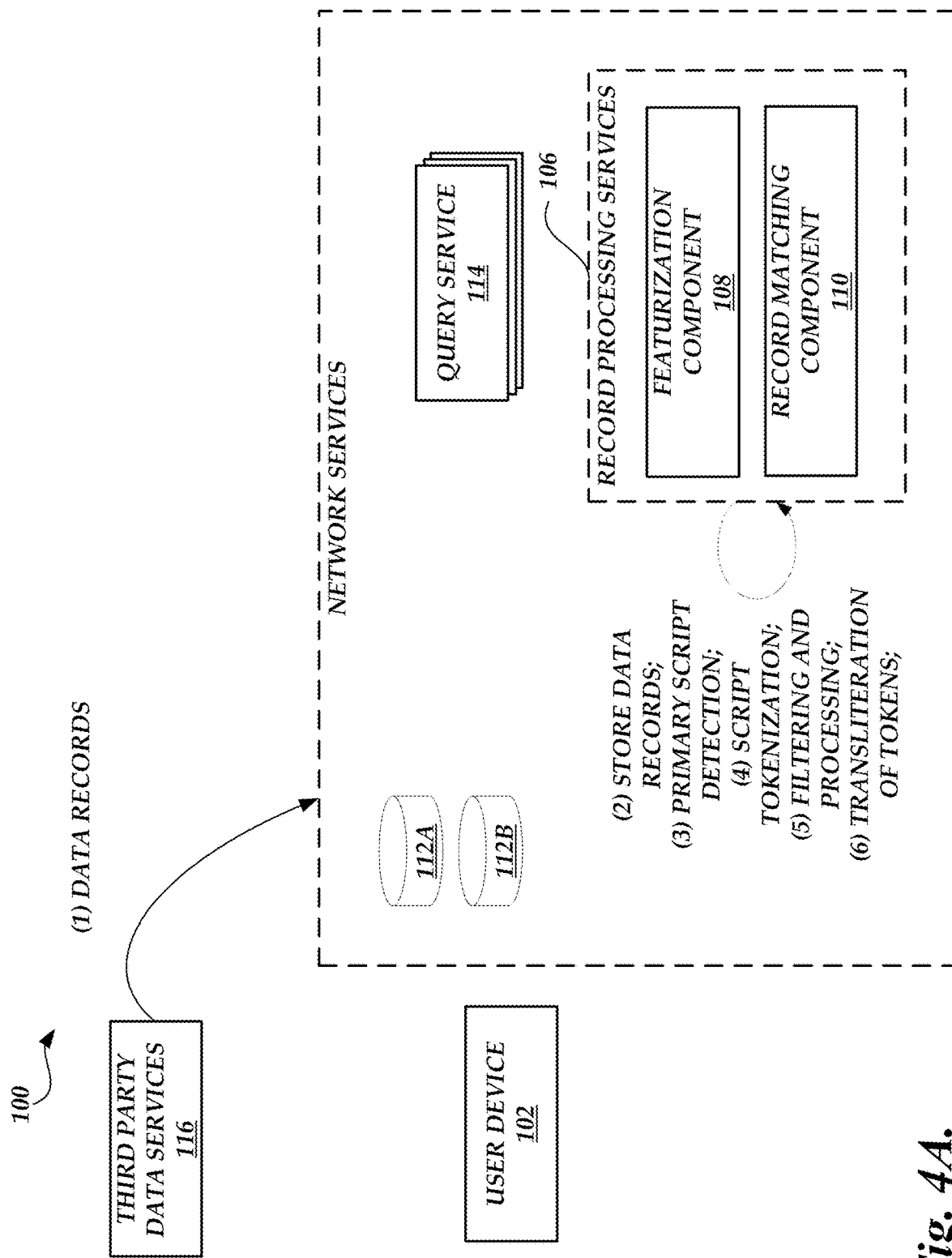
FIGS. 4A-4C are block diagrams illustrating the processing of data records to generated one or more transliterated data records for featurization in accordance with some embodiments.
Figure 4B:
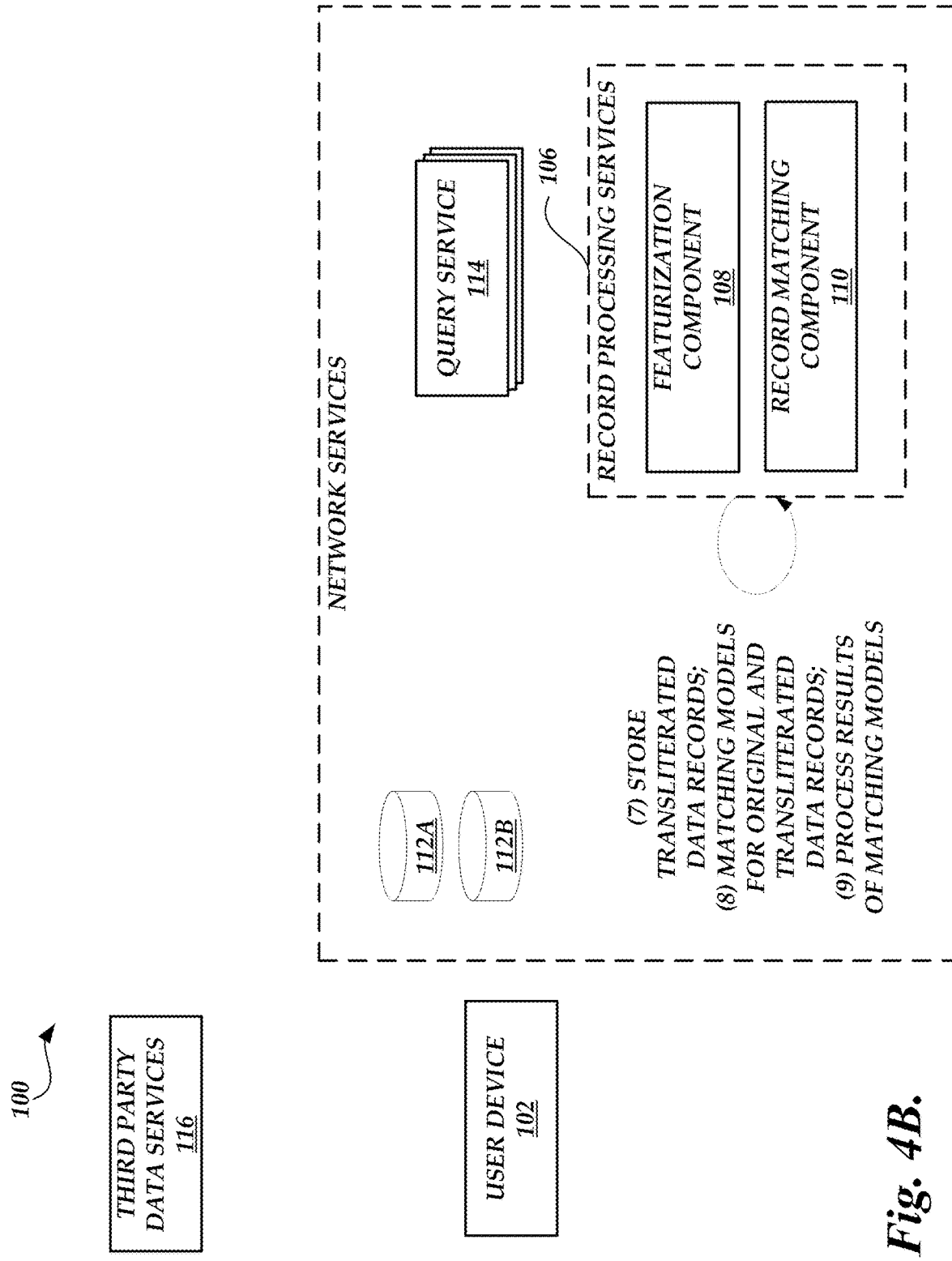
Figure 4C:
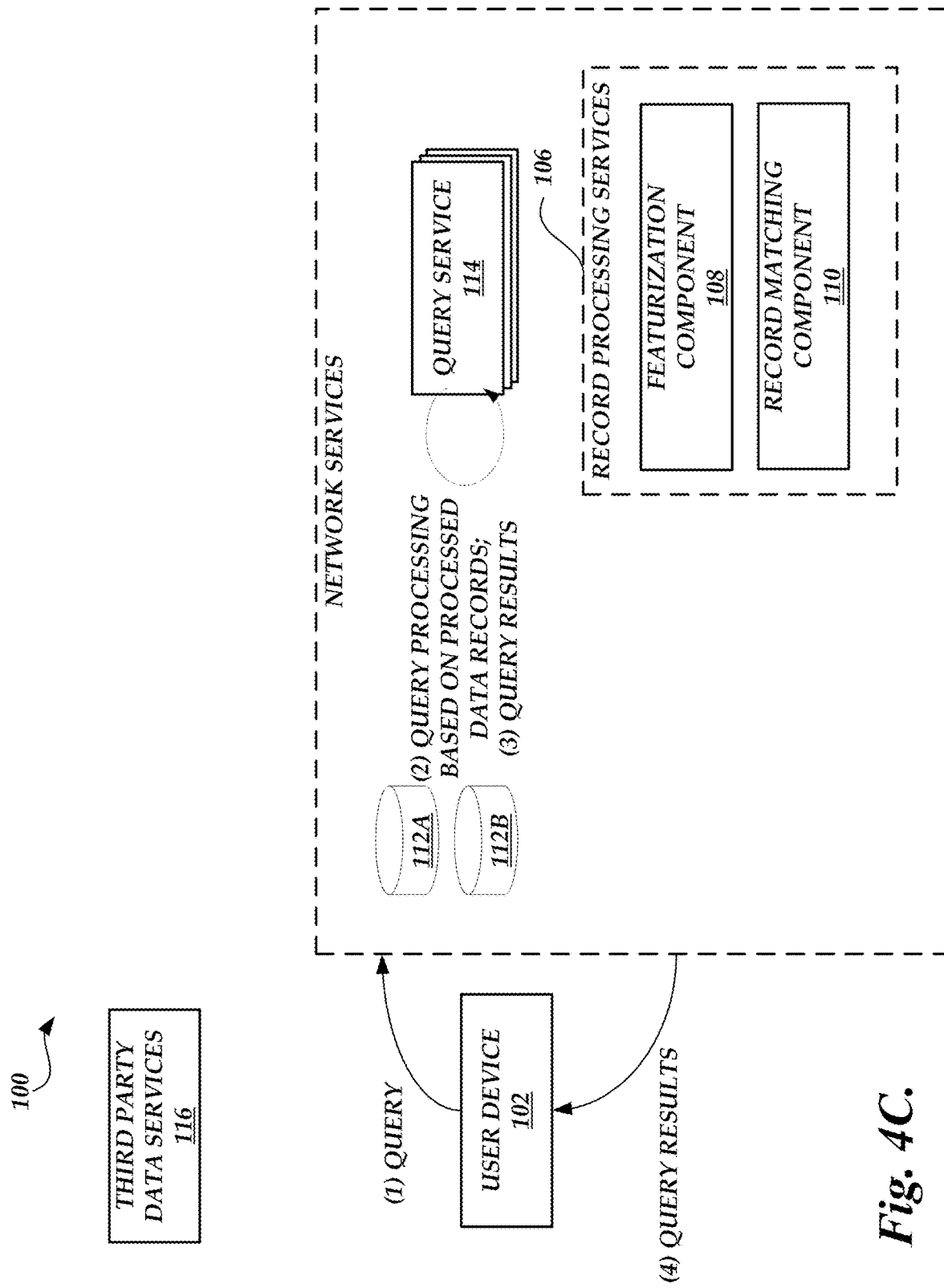

Turning now to FIGS. 4A-4C, an illustrative interaction for the receipt of data records for utilization with matching models/algorithms will be described. For purposes of illustration, it is assumed that one or more illustrative third-party data services 116 or other customer has engaged to provide data records to the records processing service 106. Illustratively, a plurality of data sources, such as multiple third-party data services 116, have provided have engaged to provide the records processing service 106 with a set of original data records. At (1), the third party data services 116 generates or collects data and transmits at least subsets of the data to the records processing service 106. Illustratively, the data records or data provided by the third party data services can be formed in a variety of formats and transmitted to the records processing service 106 in accordance with an established protocol and format, such as via an API. Individual data records have a plurality of data fields that can include text or characters. As will be explained in greater detail, at least some portion of the data fields associated with one or more of the data records can include text or characters corresponding to at least a non-phonetic and phonetic based language, such as katakana and kanji based characters in a Japanese language example. Additionally, some portion of the data records, e.g., one or more data fields of the data records, can include characters and text from multiple languages, such as a combination katakana, kanji, and English text or characters. The mix of languages can be different among data fields of the data records, such as a combination of English and kanji text/characters in a data field corresponding to organization name and katakana characters in a data field corresponding to organization location.

At (2), after receipt, the records processing service 106 stores the received set of original data records, such as by writing the collected data into database nodes 112A or 112B. Although not illustrated in FIG. 4A, the storage of the data records, generally referred to as original data records, can be implemented in a variety of ways. At (3), the records processing service 106 processes the original data records to determine a primary script language for at least a portion of the data record. As described above, the records processing service 106 can be configured to process a select number of data fields of data records that may be utilized (directly or indirectly) in the execution of a matching model. Illustratively, the records processing service 106 utilizes an identified primary script language for the selected portion of the data record to assist in the identification or association of a language for text or words in the data fields. More specifically, in one embodiment, the primary script language can provide additional context for the detection of words or phrases or assist in resolving scenarios in which a set of letters or characters may be interpreted as being based in different language. For example, for characters defined according to an international encoding standard, such as the Unicode standard, letters or characters within a defined language are grouped within a defined numbering range for individual characters, letters or words. Accordingly, the records processing service can utilize the primary range of Unicode characters associated with the detected primary language to assist in the identification of terms or characters as discussed below. This can improve the process of detection by the records processing service 106 and may facilitate a faster implementation of the processing process.

At (4), the records processing service 106 processes one or more data fields of the data record to generate one or more script tokens. Illustratively, individual script tokens correspond to the identification of letters, words, characters or portions thereof that can be transliterated. As described above, the generation of script tokens or data tokens can be influenced by the detected primary language. For example, the records processing service 106 can first look to identify a term or characters that might match the primary detected language, such as kanji or English. If the term or character cannot be matched to the primary language, then the records processing service 106 can look to match the term with another possible target language.

At (5), the records processing service 106 can further process or filter the original data records. For purposes of the transliteration, the records processing service 106 can remove one or more terms or characters that may not have a transliteration version or that otherwise not be beneficial in transliterated form. For example, the records processing service 106 can filter traditional stop words or punctuation from the original records that may be associated with a token or ignored during tokenization. In another embodiment, the records processing service 106 can ignore or omit one or more data fields of the data records that will not be used in the matching model or may be selected to be omitted. In some embodiments, the additional processing or filtering can be omitted by the records processing service 106.

At (6), the records processing service 106 processes at least a portion of the identified tokens to generate transliteration of the identified tokens into a reference language, illustratively a reference phonetic-based language. For purposes of an illustrative example, in one embodiment, the reference phonetic-based language can be katakana. Illustratively, the records processing service 106 can implement a variety of models or processes to generate transliteration of tokens. With reference to an illustrative embodiment of original data records that can include tokens based on katakana, kanji or Latin-based characters, the records processing service 106 can implement different transliteration models and techniques for the generation of a transliterated version based on the different, individual languages. In one aspect, for tokens corresponding to the selected reference phonetic-based language, such as katakana, the records processing service 106 can ignore the token because it is already in the desired phonetic-based form or otherwise have a minimal transliteration. In another aspect, for tokens corresponding to some non-phonetic based languages, such as kanji, the records processing service 106 can perform morphological processing and dictionary-based transliteration to transliterate the kanji characters into a phonetic based character based on the reference phonetic based language such as katakana. For example, the records processing service 106 can utilize statistical models of a set of kanji characters to identify word boundaries corresponding to phonetic characters/transliterations. In still another aspect, for tokens associated with other non-phonetic languages, such as Latin-based languages, the records processing service 106 can perform dictionary-based transliteration and a weighted finite-state transducers ("WFST") based transformations. Generally described, implementation of a finite-state transducers includes the utilization of finite automaton whose state transitions are labeled with both input and output symbols. Therefore, a path through the transducer encodes a mapping from an input symbol sequence to an output symbol sequence. A weighted transducer puts weights on transitions in addition to the input and output symbols. Weights may encode probabilities, durations, penalties, or any other quantity that accumulates along paths to compute the overall weight of mapping an input sequence to an output sequence. For example, a WSFT-based approach can be utilized to generate katakana transliterated versions of English characters by associating weighing values corresponding to the inputted English sequence of characters to the outputted sequence of katakana characters.

With reference now to FIG. 4B, at some point in time, the records processing service 106 can receive and store the transliterated data records in parallel with the original data records. At (8), the records processing service 106 implements matching models for the original and transliterated data records. Illustratively, the records processing service 106 implements the same matching models, such as AI algorithms, that attempt to identifying matching information in one or more fields of the data records. The matching models can correspond to a pairwise matching algorithm that attempts to match individual entries in the fields of the data records (e.g., a name field) with other entries. Such matching models can incorporate additional context of the entries to determine matching, such as grouping of terms, distance between terms and the like. In one embodiment, the records processing service 106 implements the same matching model for both the original data records and the transliterated data records. In other embodiments, the records processing service 106 can implement different matching models to account for anticipate differences in the original data records and the transliterated data records, such as the elimination of stop words or punctuation in the transliterated data records. Additionally, in some embodiments, the records processing service 106 can further combine at least portion of the original data record and transliterated data records and execute the matching model against one or more combinations of the data records. At (9), based on the results of the matching models, the records processing service 106 can utilize weighting algorithms or confidence values in processing the results. For example, the records processing service 106 can associate a confidence factor with matches based on the primary detected language and transliterated tokens (e.g., kanji primary language with English tokens). In another example, the records processing service 106 can associate a confidence factor based on a characterization of accurateness of the transliteration model between certain languages to the phonetic target language. However, in some embodiments, the records processing service 106 may not utilize confidence value or weights and treat a resulting match in any of the matching model executions as a match.

Turning now to FIG. 4C, an illustrative interaction between a query service 114, records processing service 106 and use device 102 will be described. Illustratively, FIG. 4C will be described with regard to the processing content requests, such as search queries, that are transmitted from the user device 102 to one or more service associated with the network services 104. For purposes of illustration, the interaction between the user device 102 and the network services 104 has been simplified. However, additional and alternative interactive steps may be encompassed in such interactions.

At (1), the user device 102 transmits a query or content request to the network services 104. For purposes of illustration, the query or content request can correspond to one or more requests that result in the receipt of at least a portion of the request by a query service 114. For example, the query or content request can include search criteria or subject matter specification that facilitates the formation of search criteria submitted to the query service 114.

At (2), the query service 114 transmits a request to the records processing service 106 or the database having information provided by the records processing service 106 for information satisfying the search criteria. For example, the records processing service 106 can identify one or more data records that correspond to separately identifiable data records not considered to be matching. Additionally, based on the additional processing and matching models implemented by the records processing service 106, the records processing service 106 can improve the precision and recall of the data records provided to the query service 114. At (3), the query service 114 can process the query results in a manner appropriate for the request received from the user device 102 (directly or indirectly). For example, the query service 114 can process the query results in a visual form or further process the query results based on additional information, such as profile information that facilitates filtering, sorting or prioritization of the query results. At (4), the query results are returned to the user device 102.

Generally described, by utilization of the additional transliterated data records, the records processing service 106 can provide, at least in part, data responsive to query results in a manner that improves the search results. This approach can increase the efficiency of the processing resources required by the records processing service 106, query services 114 or other service to make data available for user queries.

Figure 5:
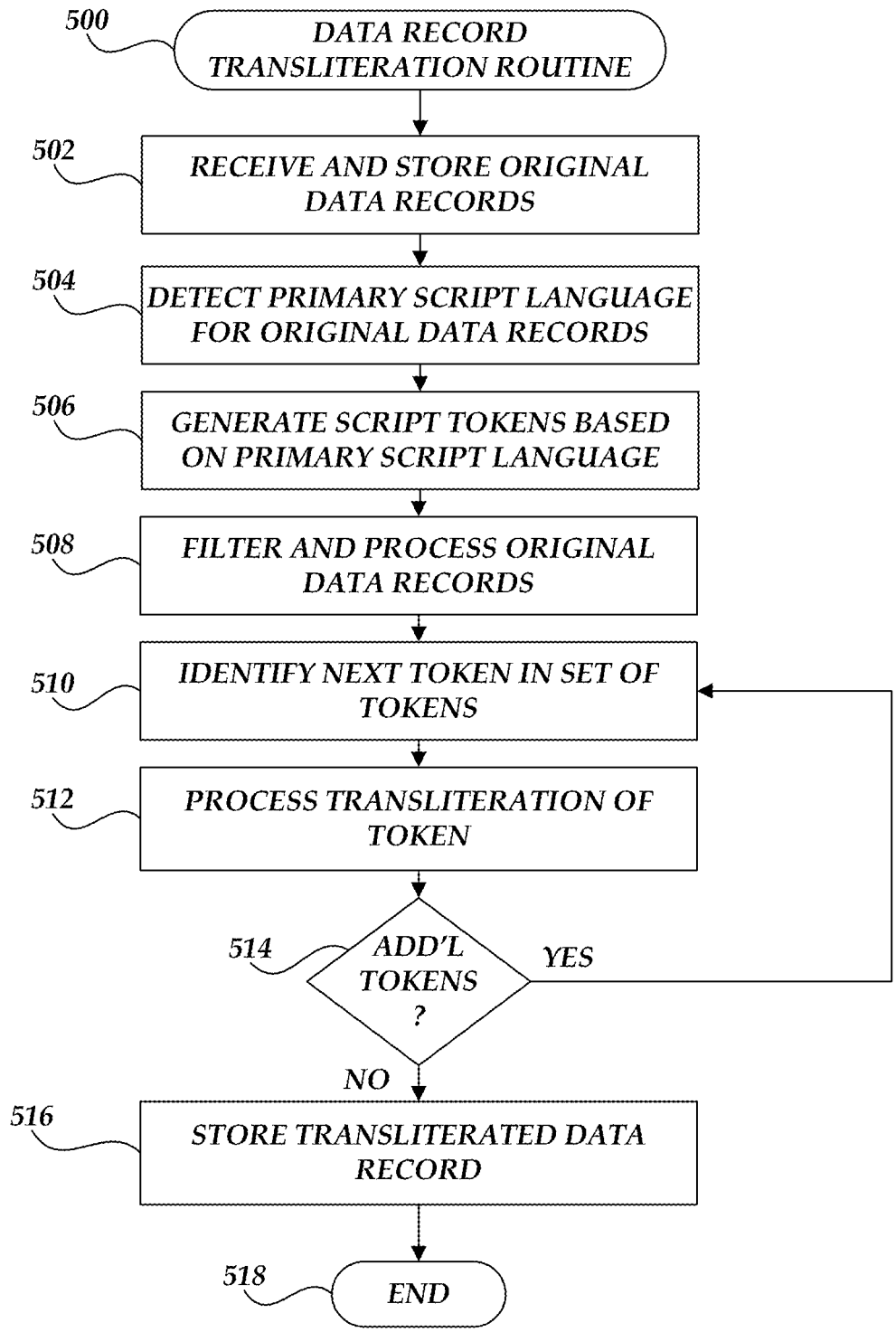
FIG. 5 is a flow diagram illustrative of a data record transliteration processing routine implemented by a data records processing service in accordance with some embodiments.

With reference to FIG. 5, a flow diagram 500 illustrative of a data records transliteration routine 500 implemented by the records processing service 106 to process original data records with one or more data fields having characters or text will be described. Illustratively, routine 500 can be implemented upon receipt of data records (e.g., a set of data records) from at least one third-party data service 116 or other source or a plurality of third-party data services 116. As previously described, it is assumed that illustrative third-party data services 116 have engaged to provide data to the records processing service 106. The third party data services 116 generates or collects data and transmits at least subsets of the data to the records processing service 106. Illustratively, the data records or data provided by the third party data services can be formed in a variety of formats and transmitted to the records processing service 106 in accordance with an established protocol and format, such as via an API.

At block 502, the records processing service 106 receives and stores the received set of data, such as by writing the collected data into database nodes 112A or 112B. The storage of the original data records in any database node or multiple database nodes can be implemented in a variety of manners and is not intended to be limited to any particular technique or type of data node. At block 504, the records processing service 106 processes the original data records to determine a primary script language for a portion of the data records (e.g., a selection of data fields of the original data records). Illustratively, the records processing service 106 utilizes a primary script language to assist in the identification of text or words with one or more fields. More specifically, in one embodiment, the primary script language can provide additional context for the detection of words or phrases or assist in resolving in scenarios in which a set of letters or characters may be interpreted in multiple ways. As described above, for characters defined according to an international encoding standard, such as the Unicode standard, letters or characters within a defined language are grouped within a defined numbering range. Accordingly, the records processing service can utilize the primary range of Unicode characters associated with the detected primary language to assist in the identification of terms or characters as discussed below.

At block 506, the records processing service 106 processes the data fields of the data records to generate one or more script tokens. Illustratively, individual script tokens correspond to the identification of letters, words, characters or portions thereof that can be transliterated. As described above, the generation of script tokens or data tokens can be influenced by the detected primary language. For example, the records processing service 106 can first look to identify a term or characters that might match the primary detected language, such as kanji or English. If the term or character cannot be matched to the primary language, then the records processing service 106 can look to match the term with another possible target language.

At block 508, the records processing service 106 can further process or filter the original data records. For purposes of the transliteration, the records processing service 106 can remove one or more terms or characters that may not have a transliteration version or that otherwise not be beneficial in transliterated form. For example, the records processing service 106 can filter traditional stop words or punctuation from the original records that may be associated with a token or ignored during tokenization or further exclude data fields from processing (even if they include data having one or more language). In some embodiments, the additional processing or filtering can be omitted by the records processing service 106.

At blocks 510-block 514, the records processing service 106 processes at least a portion of the identified token to generate transliteration of the identified tokens into a phonetic-based language. More specifically, the records processing service 106 can individually process a set of tokens corresponding to one or more fields of the data records. Illustratively, the processing can correspond to an iterative process beginning with block 510 with the identification of the next token to be processed. At block 512, the records processing service 106 processes the transliteration of the selected token. Illustratively, the records processing service 106 can implement a variety of models or processes to generate transliteration of tokens. With reference to an illustrative embodiment of original data records that can include tokens based on katakana, kanji or some Latin-based characters, the records processing service 106 can implement different models and techniques for the different, individual languages. In one aspect, for tokens corresponding to phonetic-based language, such a katakana, the records processing service 106 can ignore the token because it is already in a form phonetic-based form or otherwise have a minimal transliteration. In another aspect, for tokens corresponding to some non-phonetic based languages, such as kanji, the records processing service 106 can perform morphological processing and dictionary-based transliteration to transliterate the kanji characters into a phonetic based character such as katakana. For example, the records processing service 106 can utilize statistical models of a set of kanji characters to identify word boundaries corresponding to phonetic characters/transliterations. In still another aspect, for tokens associated with other non-phonetic languages, include some Latin-based languages such as English, the records processing service 106 can perform dictionary-based transliteration and weighted finite-state transducers ("WFST") based transformations. As described above, a weighted transducer puts weights on transitions in addition to the input and output symbols. Weights may encode probabilities, durations, penalties, or any other quantity that accumulates along paths to compute the overall weight of mapping an input sequence to an output sequence. For example, a WSFT-based approach can be utilized to generate katakana transliterated versions of English characters by associating weighing values corresponding to the inputted English sequence of characters to the outputted sequence of katakana characters. In still another aspect, for tokens associated with other phonetic languages not corresponding to the reference phonetic-based language, including Latin-based languages such as Spanish, the records processing service 106 can perform dictionary-based transliteration or other custom techniques.

At decision block 514, the records processing service 106 determines whether additional tokens should be transliterated. If so, the routine 500 returns to block 510 to identify the next token to be transliterated. Alternatively, if no additional tokens should be transliterated, at block 516, the records processing service 106 stores or causes to be stored the transliterated data records. Routine 500 terminates at block 518.

Figure 6:
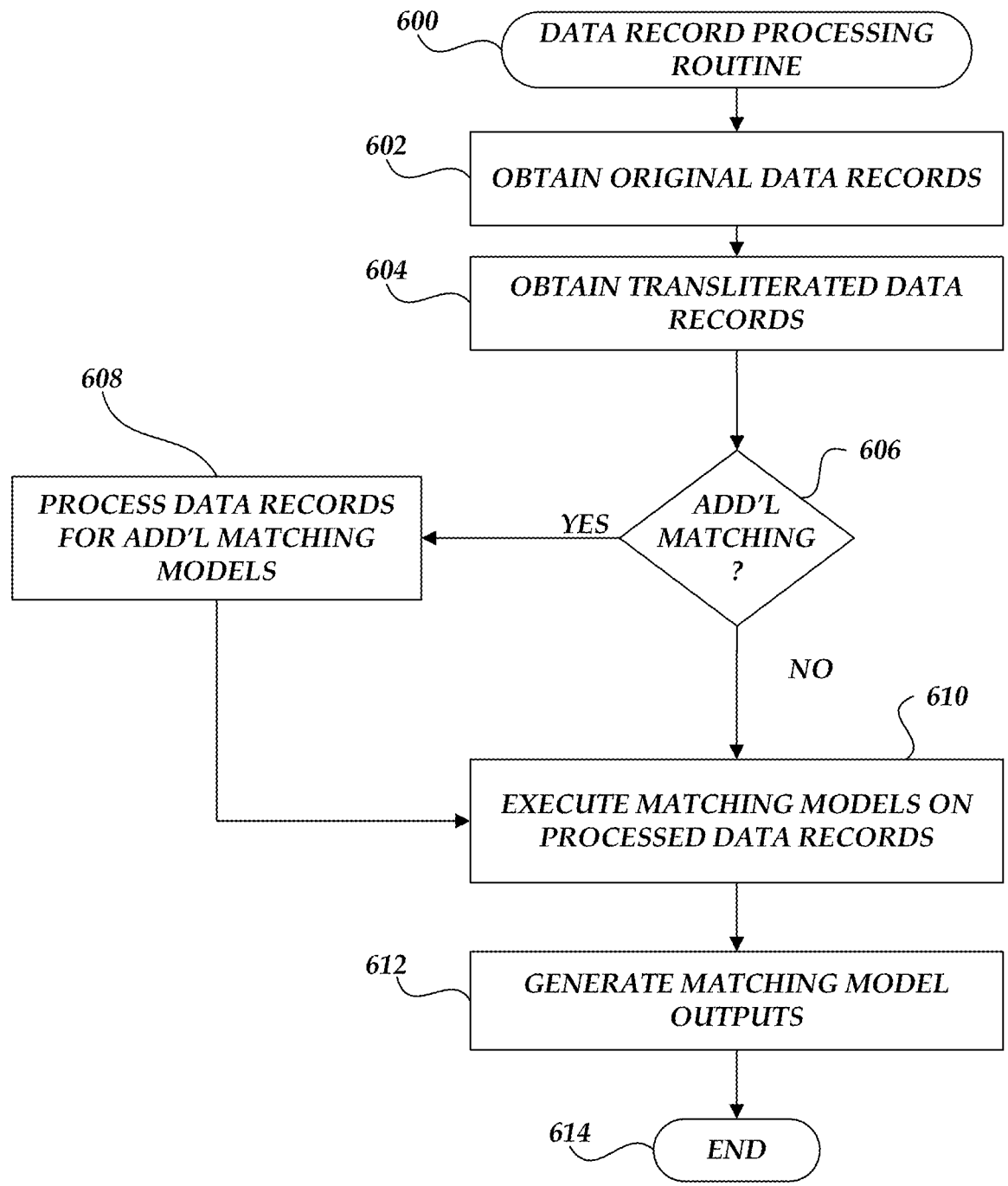
FIG. 6 is a flow diagram illustrative of a data record processing routine implemented by a network service in accordance with some embodiments.

With reference to FIG. 6, a flow diagram 600 illustrative of a data records processing routine 600 implemented by the records processing service 106 will be described. Illustratively, routine 500 can be implemented upon processing of the data records to form transliterated versions of the data records as described herein. As previously described, the records processing service 106 stores and processes the original data records and makes the original data records and transliterated data records available for application of a matching model.

At block 602, the records processing service 106 obtains the original data records, which have been received and previously stored. At block 604, the records processing service 106 obtains the transliterated data records, which may have been previously processed. Alternatively, the implementation of block 604 can correspond to a request to implement the generation of transliterated data records as described above.

In some embodiments, the records processing service 106 can further combine at least portion of the original data record and transliterated data records and execute the matching model against the combined data records. Accordingly, at decision block 606, a test is conducted to determine whether additional matching models will be executed. If so, at block 608, the records processing service 106 processes the data records for the additional matching models. For example, the records processing service 106 can combine the transliterated and original data records. In other embodiments, the records processing service 106 can generate subsets of the transliterated data records and original data record. In still other embodiments, the records processing service 106 can filter out one or more tokens relate to a target language, such as target languages have a higher error rate in detecting matches. At block 612, the records processing service 106 executes the matching models on the additional processed data records.

At block 610, the records processing service 106 implements matching models for at least the original and transliterated data records and any additional data records generated by the records processing service at block 606. Illustratively, the records processing service 106 implements the same matching models, such as AI algorithms, that attempt to identify matching information in one or more fields of the data records. The matching models can correspond to a pairwise matching algorithm that attempts to match individual entries in the fields of the data records (e.g., a name field) with other entries. Such matching models can incorporate additional context of the entries to determine matching, such as grouping of terms, distance between terms and the like. In one embodiment, the records processing service 106 implements the same matching model for both the original data records and the transliterated data records. In other embodiments, the records processing service 106 can implement different matching models to account for anticipate differences in the original data records and the transliterated data records, such as the elimination of stop words or punctuation in the transliterated data records.

At block 612, based on the results of the matching models, the records processing service 106 can utilize weighting algorithms or confidence values in processing the results. For example, the records processing service 106 can associate a confidence factor with matches based on the primary detected language and transliterated tokens (e.g., kanji primary language with English tokens). In another example, the records processing service 106 can associate a confidence factor based on a characterization of accurateness of the transliteration model between certain languages to the phonetic target language. However, in some embodiments, the records processing service 106 may not utilize confidence value or weights and treat a resulting match in any of the matching model executions as a match. At block 614, the routine 600 terminates.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to process data for data queries comprising:
one or more computing devices associated with a records processing service, wherein the records processing service is configured to:
receive original data records, wherein at least one original data records includes one or more data fields associated with at least one phonetic based language and at least one non phonetic based language;
for individual data fields of the one or more data fields of the original data records:
process the individual data fields of the original data records to identify a primary language for the individual data fields of the original data records;
based on the primary language, generate language based tokens for terms or characters included in the individual data fields of the original data records, wherein at least one language based token of the language based tokens corresponds to the at least one phonetic based language and at least one language based token in the language based tokens corresponds to at least one non phonetic based language;
filter, based on the generated language based tokens, the original data records to remove at least some portion of data in the individual data fields of the original data records; and
transliterate the generated language based tokens into a reference phonetic based language to form a transliterated version of the original data records;
execute a matching model on the original data records and the transliterated version of the original data records;
identify, based on results of the execution of the matching model on the original data records and the transliterated version of the original data records, a data field of a first data record of the original data records and a data field of a second data record of the original data records that contain matching information; and
merge the identified the first data record and the second data record of the original data records to generate updated data records.

2. The system of claim 1, wherein the language based tokens for the terms or characters included in the individual data fields of the original data records include a plurality of language based tokens corresponding to at least two non phonetic based languages.

3. The system of claim 2, wherein the records processing service implements different transliteration processes based on the at least two non phonetic languages.

4. The system of claim 1, wherein the records processing service omits transliteration of language based tokens corresponding to the reference phonetic based language.

5. The system of claim 1, wherein the records processing service is further configured to execute an additional matching model on the original data records and the transliterated version of the original data records.

6. A computer-implemented method to process data records, the method comprising:
receiving original data records, wherein at least one data record of the original data records includes a plurality of portions and wherein at least one portion of the plurality of portions includes text or characters associated with at least one phonetic based language and at least one non phonetic based language;
for individual portions of the original data records:
generating language based tokens for the individual portions of the original data records, wherein at least one language based token in the language based tokens corresponds to a first language and at least one language based token in the language based tokens corresponds to a second language, wherein the first language corresponds to a reference phonetic based language; and
transliterating the generated language based tokens into the first language to form a transliterated version of the original data records;
executing a matching model on the original data records and the transliterated version of the original data records;
identifying, based on results of the execution of the matching model on the original data records and the transliterated version of the original data records, a portion of a first data record of the original data records and a portion of a second data record of the original data records that include matching information; and
merging the first data record and second data record of the original data records to generate updated data records.

7. The computer-implemented method of claim 6 further comprising filtering the original data records to remove one or more characters or terms of the individual portions of the original data records.

8. The computer-implemented method of claim 6 further comprising processing the individual portions of the original data records to identify a primary language for the individual portions of the original data records.

9. The computer-implemented method of claim 8, wherein generating language based tokens for the individual portions of the original data records includes generating language based tokens based on the identified primary language.

10. The computer implemented method of claim 9, wherein generating language based tokens based on the identified primary language includes comparing the individual portions based on a range of Unicode values associated with the identified primary language.

11. The computer implemented method of claim 6, wherein the language based tokens for the individual portions of the original data records include a plurality of language based tokens corresponding to at least the second language and a third language.

12. The computer implemented method of claim 11, wherein transliterating the generated language based tokens into the first language to form a transliterated version of the original data records includes implementing different transliteration processes based on the second and third language.

13. The computer-implemented method of claim 6 further comprising executing an additional matching model on the original data records and the transliterated version of the original data records.

14. The computer implemented method of claim 6 further comprising associating one or more confidence values based on executing the matching model on the original data records and the transliterated version of the original data records.

15. The computer-implemented method of claim 6, wherein the second language include at least one of kanji or a Latin-based language.

16. The computer implemented method of claim 6, wherein the first language includes katakana.

17. The computer implemented method of claim 6, wherein the second language corresponds to English and wherein transliterating the generated language based tokens into the first language to form a transliterated version of the original data records includes implementing a weighted finite-state transducer.

18. A computer-implemented method to manage data received by a records processing service for linking data records, the method comprising:
   generating language based tokens for individual portions of original data records, wherein at least one language based token in the language based tokens corresponds to at least one phonetic based language and at least one language based token in the language based tokens corresponds to at least one non phonetic based language;
   transliterating the generated language based tokens into a reference phonetic based language to form a transliterated version of the original data records;
   executing a matching model on the original data records and the transliterated version of the original data records; and
   identifying, based on results of the execution of the matching model on the original data records and the transliterated version of the original data records, a portion of a first data record of the original data records and a portion of a second data record of the original data records that include matching information; and
   associating the first data record and second data record of the original data records.

19. The computer-implemented method of claim 18 further comprising processing the individual portions of the original data records to identify a primary language for the individual portions of the original data records.

20. The computer-implemented method of claim 19, wherein generating language based tokens for the individual portions of the original data records includes generating language based tokens based on the identified primary language.

21. The computer implemented method of claim 18, wherein the language based tokens for the individual portions of the original data records include a plurality of language based tokens corresponding to at least two languages not including the reference phonetic based language.

22. The computer implemented method of claim 21, wherein transliterating the generated language based tokens into a phonetic based language to form a transliterated version of the original data records includes implementing different transliteration processes based on a phonetic based language.

\* \* \* \* \*